3,597,427
1,2-DIHYDROPYRIDO[3,4-e]-as-TRIAZINES
Benjamin Arthur Lewis, Suffern, and Robert Gordon Shepherd, South Nyack, N.Y., assignors to American Cyanamid Company, Stamford, Conn.
No Drawing. Filed Jan. 13, 1969, Ser. No. 790,833
Int. Cl. C07d 55/10
U.S. Cl. 260—248AS    6 Claims

ABSTRACT OF THE DISCLOSURE

This disclosure describes compounds of the class of 3-substituted-pyrido[3,4-e] - as - triazines and 1,3 - disubstituted-1,2-dihydropyrido[3,4e] - as - triazines useful as antibacterial, antifungal, analgesic and antiinflammatory agents.

BRIEF SUMMARY OF THE INVENTION

This invention relates to new organic compounds and, more particularly, is concerned with novel 3-substituted-pyrido-[3,4-e]as-triazines and 1,3-disubstituted - 1,2-dihydropyrido-[3,4-e]-as-triazines and with methods of preparing these compounds. The novel compounds of the present invention may be represented by the following general formulae:

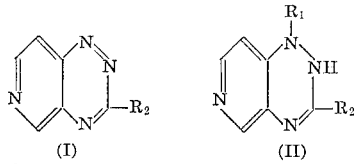

wherein $R_1$ is hydrogen or lower alkyl and $R_2$ is hydrogen, lower alkyl or lower carboalkoxy. Lower alkyl groups contemplated by the present invention are those having from 1 to 4 carbon atoms such as, for example, methyl, ethyl, n-propyl, isopropyl, n-butyl, etc. Suitable lower carboalkoxy groups are those having from 2 to 5 carbon atoms such as, for example, carbomethoxy, carbethoxy, carboisopropoxy, etc. Typical compounds of the present invention represented by the above general formulae are, for example, 3-n-butylpyrido[3,4-e]-as-triazine,
3-carbethoxypyrido[3,4-e]-as-triazine,
3-ethylpyrido[3,4e]-as-triazine,
3-carbomethoxypyrido[3,4-e]-as-triazine,
3-n-butyl-1,2-dihydropyrido[3,4-e]-as-triazine,
3-ethyl-1,2-dihydropyrido[3,4-e]-as-triazine,
1-isopropyl-3-ethyl-1,2-dihydropyrido[3,4-e]-as-triazine,
3-carbethoxy-1,2-dihydropyrido[3,4-e]-as-triazine,
1-n-butyl-1,2-dihydropyrido[3,4-e]-as-triazine,
1-ethyl-1,2-dihydropyrido[3,4-e]-as-triazine,
1-ethyl-3-carboisopropoxy-1,2-dihydropyrido[3,4-e]-as-triazine,
3-carbomethoxy-1,2-dihydropyrido[3,4-e]-as-triazine,
1,3-dimethyl-1,2-dihydropyrido[3,4-e]-as-triazine and
1-isopropyl-3-carbomethoxy-1,2-dihydropyrido[3,4-e]-as-triazine.

DETAILED DESCRIPTION OF THE INVENTION

The novel compounds of the present invention form nontoxic acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. For purposes of this invention, the free bases are equivalent to their non-toxic acid-addition salts.

The novel compounds of the present invention are generally obtainable as yellow or orange crystalline materials having characteristic melting points and absorption spectra and which may be purified by recrystallization from common organic solvents such as n-heptane, benzene, and ethyl acetate. They are appreciably soluble in may organic solvents such as methanol, ethanol, acetone, chloroform, and the like but are relatively insoluble in water. The acid-addition salts of the organic free bases of this invention are, in general, crystalline solids relatively soluble in water, methanol and ethanol but relatively insoluble in non-polar organic solvents such as diethyl ether, benzene, toluene, and the like.

The novel 1,3-disubstituted-1,2-dihydropyrido[3,4 - e]-as-triazines (II) of the present invention may be readily prepared from a 3-nitro-4-halopyridine (III) as illustrated in the following reaction scheme:

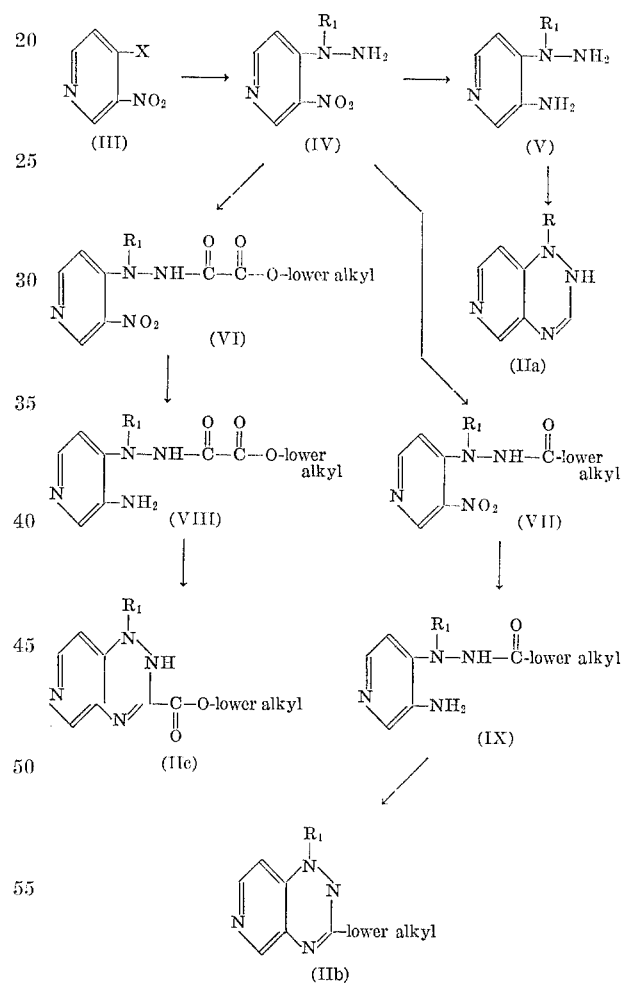

wherein X is chloro or bromo and $R_1$ and lower alkyl are as hereinabove defined. In accordance wth the above reaction scheme, a 3-nitro-4-halopyridine (III) is treated with hydrazine hydrate or a mono(lower alkyl)hydrazine to provide the corresponding 3-nitro-4-hydrazinopyridine (IV). This reaction is best carried out in ethanol as solvent at room temperature (25° C.) for a period of time of from about 15 minutes to 3 hours or more. The product (IV) may be extracted from the water-diluted reaction mixture with chloroform and purified by recrystallization from ethanol. Catalytic hydrogenation of the 3-nitro-4-hydrazinopyridine (IV) with 10% palladium-oncarbon in ethanol at room temperature (25° C.) and about 30–35 p.s.i. hydrogen pressure for a period of time of from about 5 minutes to half an hour affords the corresponding 3-amino-4-hydrazinopyridine (V). Removal of the catalyst by filtration and concentration of the filtrate gives the crude product (V) which may be purified by recrystallization from benzene. Cyclization of the 3-amino-4-hydrazinopyridine (V) with triethyl orthoformate and concentrated hydrochloric acid at room temperature (25° C.) for a period of time of about 1–2 hours affords the 1,2-dihydropyrido[3,4-e]-as-triazine (IIa). This product (IIa) precipitates from the reaction mixture and may be collected by filtration and recrystallization from ethanol.

Acylation of a 3-nitro-4-hydrazinopyridine (IV) with a lower alkanoic acid anhydride

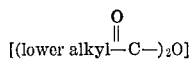

affords the corresponding 3-nitro-4-(2-acylhydrazino)pyridine (VII). This reaction is best carried out in an excess of the anhydride as solvent at room temperature (25° C.) for a period of time of about one hour or more. The product (VII) may be extracted from the water diluted reaction mixture with chloroform and purified by recrystallization from benzene. Catalytic hydrogenation of the 3-nitro-4-(2-acylhydrazino)pyridine (VII) with 10% palladium-on-carbon in ethanol at room temperature (25° C.) and about 25–30 p.s.i. hydrogen pressure for a period of time of from about 5 minutes to half on hour affords the corresponding 3-amino-4-(2-acylhydrazino)pyridine (IX). Removal of the catalyst by filtration and concentration of the filtrate gives the crude product (IX) which may be purified by recrystallization from chloroform. Cyclization of the 3-amino-4-(2-acylhydrazino)pyridine (IX) in 6 N ethanolic hydrogen chloride at room temperature (25° C.) for a period of time of about 5 minutes or so affords the 3-lower alkyl-1,2-dihydropyrido-[3,4-e]-as-triazine (IIb). This product (IIb) may be isolated by concentration of the reaction mixture followed by recrystallization of the residue from ethanol.

Acylation of a 3-nitro-4-hydrazinopyridine (IV) with a lower alkoxalyl halide

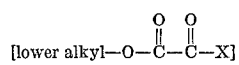

affords the corresponding 3-nitro-4-(2-alkoxalylhydrazino)pyridine (VI). This reaction is best carried out in chloroform as solvent and in the presence of an equimolar amount of a base such as triethylamine at room temperature (25° C.) for a period of time of about one hour or more. Concentration of the reaction mixture, after washing with water, and recrystallization of the residue from benzene gives the purified product (VI). Catalytic hydrogenation of the 3-nitro-4-(2-alkoxalylhydrazino)pyridine (VI) with 10% palladium-on-carbon in ethanol at room temperature (25° C.) and about 25–35 p.s.i. hydrogen pressure for a period of time from about 5 minutes to half an hour affords the corresponding 3-amino-4-(2-alkoxyalylhydrazino)pyridine (VIII). Removal of the catalyst by filtration and concentration of the filtrate gives the crude product (VIII) which may be purified by recrystallization from benzene. Cyclization of the 3-amino-4-(2-alkoxyalylhydrazino)pyridine (VIII) in 6 N ethanolic hydrogen chloride at room temperature (25° C.) for a period of time of about 5 minutes or so gives the 3-lower carboalkoxy-1,2-dihydropyrido[3,4-e] - as-triazine (IIc). This product (IIc) may be isolated by concentration of the reaction mixture followed by recrystallization of the residue from ethanol.

The novel 3-substituted-pyrido[3,4-e]-as-triazine (I) of the present invention may be readily prepared by the oxidation of the corresponding 3-substituted-1,2-dihydropyrido[3,4-e]-as-triazines (X) as set forth in the following reaction scheme:

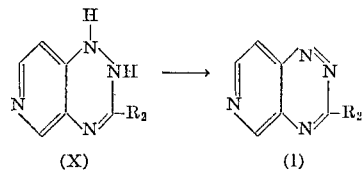

wherein $R_2$ is as hereinabove defined. This oxidation reaction is carried out with ferricyanide ions in dilute aqueous ammonium hydroxide at room temperature for a period of time of a few minutes. The product (I) may be extracted from the reaction mixture with chloroform and purified by recrystallization from benzene.

The novel compounds of the present invention are useful as antibacterial and antifungal agents and possess broad-spectrum antibacterial and antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. A second set of agar dilutions is prepared identical to the first except that the nutrient agar is designed to support the growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria and yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial or fungal growth is noted. The minimal inhibitory concentration (expressed in micrograms per milliliter) is defined as the concentration of test compound causing complete inhibition of growth of any particular organism.

The standard laboratory microorganisms employed in the above-described assay were the following:

Bacteria (1) *Mycobacterium smegmatis* ATCC 607
(2) *Staphylococcus aureus* ATCC 6538P
(3) *Bacillus substilis* ATCC 6633
(4) *Proteus vulgaris* ATCC 9484
(5) *Escherichia coli* ATCC 9637
(6) *Salmonella gallinarum* Lederle 604

Fungi (7) *Candida albicans* Bergen strain E3
(8) *Candida mycoderma* ATCC 9888
(9) *Saccharomyces cerevisiae* ATCC 4100
(10) *Mucor ramannianus* M–143
(11) *Fusarium episphaeria* F–105
(12) *Hormodendrum cladosporoides* Z–516
(13) *Trichophyton mentagrophytes* E–11
(14) *Microsporum gypseum* E–28
(15) *Penicillium digitatum* P–308B
(16) *Memnoniella echinata* Z–583
(17) *Chaetomium globosum* H–71
(18) *Aspergillus fumigatus* S–246

In a representative operation, and merely by way of illustration, the minimal inhibitory concentration of typical compounds of this invention against the above test organisms as determined in the above-described assay are set forth in Tables I and II below:

TABLE I

[In vitro antibacterial activities minimal inhibitory concentration (mcg./ml.)]

| Compound | Bacteria | | | | | |
|---|---|---|---|---|---|---|
| | 1 | 2 | 3 | 4 | 5 | 6 |
| 1,2-dihydropyrido[3,4-e]-as-triazine | 125 | >250 | 62 | 125 | 250 | 250 |
| Pyrido[3,4-e]-as-triazine | 62 | 62 | 31 | 62 | 125 | 125 |
| 3-methylpyrido[3,4-e]-as-triazine | 62 | >250 | 31 | 125 | 125 | 125 |
| 1,2-dihydro-3-methylpyrido-[3,4-e]-as-triazine hydrochloride | 62 | >250 | 62 | 125 | 250 | 250 | demonstrating analgesic activity of the non-narcotic type (e.g. aspirin, indomethacin). The procedure also responds to narcotics and some narcotic antagonists. Pressure is applied to the plantar surface of the rat's hind paw which has been inflamed with 0.1 milliliter of a 20% brewers' yeast suspension. The pressure required for the rat to characteristically struggle and/or vocalize is measured in millimeters of mercury (pressure-pair response). Control rates (no drug) respond at about 100 millimeters of mercury pressure.

In a representative operation, and merely by way of illustration, the results obtained with typical compounds of the present invention in the two tests described hereinabove are set forth in Table III below.

TABLE III.—ANALGESIC TESTING

| Compound | Test 1.—Mouse anti-writhing | | Test 2.—Inflamed rat paw pressure-pain threshold | |
|---|---|---|---|---|
| | Decision | Oral Dose, mg./kg. | Decision | Percent over control (mg./kg. p.o.) |
| Pyrido[3,4-e]-as-triazine | Active | 100 | Active | 68 (100) |
| 1,2-dihydropyrido[3,4-e]-as-triazine hydrochloride | do | 200 | | |
| 1,2-dihydro-3-methylpyrido[3,4-e]-as-triazine hydrochloride | do | 200 | | |
| 3-methylpyrido[3,4-e]-as-triazine | do | 200 | Active | 51 (200) |

TABLE II

[In vitro antifungal activities minimal inhibitory concentration (mcg./ml.)]

| Compound | Fungi | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 |
| 1,2-dihydropyrido[3,4-e]-as-triazine hydrochloride | 62 | 62 | 31 | 62 | 62 | 62 | 15 | 31 | 31 | 62 | 62 | 62 |
| Pyrido[3,4-e]-as-triazine | 31 | 31 | 15 | 31 | 15 | 15 | 4 | 8 | 8 | 31 | 31 | 31 |
| 3-methylpyrido[3,4-e]-as-triazine | 15 | 8 | 8 | 31 | 31 | 8 | 15 | 31 | 62 | 62 | 31 | |
| 1,2-dihydro-3-methylpyrido[3,4-e]-as-triazine hydrochloride | 62 | 31 | 31 | 62 | 62 | 15 | 62 | 62 | 62 | 62 | 62 | |

The novel compounds of the present invention are also useful as analgesic and anti-inflammatory agents. The analgesic and anti-inflammatory activity of the compounds of the invention have been determined using two different controlled animal tests as follows:

(1) Anti-writhing phenyl-p-quinone test

The method is based upon the reduction of the number of writhes following the intraperitoneal injection of 1 milligram per kilogram of body weight of phenyl-p-quinone (PPQ) in male Swiss albino mice obtained weekly from Manor Farms, the mice weighing 15–25 grams per mouse at the time of use. The syndrome is characterized by intermittent contractions of the abdomen, twisting and turning of the trunk and extension of the hind legs beginning 3 to 5 minutes after injection. Control mice show the syndrome continuously for more than 30 minutes. A compound is considered active if it reduces the total number of writhes in 2 test mice from an historical control value of approximately 30 per pair to a value of 18 or less (counted for a 3 minute period of time, 15 minutes after injection of PPQ). The test is repeated, using 2 more mice. The compound is considered inactive if the number of writhes per pair exceeds 18 in either test. The compound is considered active if the number of writhes per pair is 18 or less in both tests.

(2) Brewers' yeast inflamed rat paw pressure-pain threshold

The use of brewers' yeast as an inflammatory agent to increase the sensitivity of the hind paws of rats is useful in In addition, compounds of this invention have shown anti-inflammatory activities when tested by the three additional procedures described hereinbelow. The ultraviolet-induced erythema test and the yeast-induced pyrexia test and the statistical criteria derived using statistical techniques are described in a report by C. W. Dunnett and R. A. Lamm, "Sequential Procedure for Drug Screening," presented at the September 1962, meeting of the American Statistical Association. The procedures are as follows:

(3) Carrageenin-induced rat paw edema

In this test weanling Sherman strain rats ranging in weight from 50–55 grams are used and fed standard laboratory diet ad libitum. The test compound is administered to the rats by gavage (250 milligrams per kilogram in a volume of 1.7 milliliters of buffered aqueous starch) one hour prior to challenge with carrageenin. The challenge agent, carrageenin, is obtained from Marine Colloids, 2 Edison Place, Springfield, N.J. and prepared as a sterile 1% suspension in 0.09% aqueous sodium chloride. A volume of 0.05 milliliter is injected using a 26-gauge needle into the plantar tissue of the right hind paw of treated and untreated rats. Measurements of the volumes of the carrageenin inflamed right (challenged) paw and left (unchallenged) paw are determined 4 hours subsequent to the carrageenin challenge. The method of determining paw volumes is carried out essentially as described by C. A. Winter, et al., in Proc. Soc. Exptl. Biol. Med. 111: 544–547 (1962) using mercury immersion. The differences in volume between the two paws of each rat is considered to be the volume of the carrageenin induced edema. The mean edema volume of eight control rats divided by the mean edema volume of two treated rats is calculated and designated the $C/T$ efficacy ratio. A compound is considered active in this test if the mean $C/T$ efficacy ratio of 2 consecutive tests is equal to or greater than 1.43.

(4) Rat ear ultraviolet-induced erythema

Test compounds are adminisered orally to groups of 3 rats each (Sherman strain rats, weighing 50+5 grams each) in dosages of 250 milligrams per kilogram of body weight in a 2% acacia vehicle. One hour after administration of the compounds, the treated rats and control rats are subjected to dermal ultraviolet irradiation of the right ear for 90 seconds with a 550 watt Hanovia Lamp. At two hours post-irradiation, the irradiated sites of both test and control rats are visually graded as to the degree of induced erythema on a scale of 0 to 4.0 where 0 represents a minimum degree of erythema and 4.0 represents a maximum degree of erythema. The averaged numerical value of each group is then appropriately inserted into the ratio of control rats to treated rats, abbreviated C/T. The test is designed in three sequential stages, so that an acceptable compound requires three testing stages, although one, two or three stages may be required for rejection. Those test compounds are judged active in which the geometric mean of the C/T values of rats observed is above 1.20 at stage one, above 1.63 at stage two, and above 2.20 at stage three, and at which latter point a compound is accepted as an active anti-inflammatory agent. If at any stage the geometric means of the C/T values is below the above-mentioned critical values, the compound is rejected as being inactive.

(5) Yeast-induced pyrexia in rats

To groups of three Sherman strain rats, weighing 55+5 grams each are administered subcutaneously in the napes of the necks, 0.6 milliliter of a 40% suspension of dried yeast in distilled water. Each test compound is then administered orally at a dosage of 250 milligrams per kilogram in a 2% acacia vehicle at seventeen hours post-challenge. Control rats are treated in a similar manner but are not given the test compounds. At nineteen hours post-challenge the rectal temperature of each rate is recorded. The averaged numerical temperature for each group is then appropriately inserted into the relationship of control rats minus treated rats, abbreviated C–T. The test is designed in three sequential states, so that an acceptable compound requires three testing stages although one, two or three stages may be required for rejection. Those test compounds are judged active in which the C–T value is above 0.44 at stage one, and the averaged C–T value of both runs is above 0.55 at stage two, and the averaged C–T value of three runs is above 0.61 at stage three, at which latter point the compound is accepted as an active anti-pyretic agent. If at any stage the average of the C–T values is below the above mentioned critical values, the compound is rejected as being inactive.

In a represenative operation, and merely by way of illustration, the results obtained with a typical compound of the present invention in Tests 3, 4 and 5 described hereinabove are set forth in Table IV below.

TABLE IV
[Anti-inflammatory testing on pyrido[3,4-e]-as-triazine]

| Test No. | Test name | Dose, mg./kg. | Result |
|---|---|---|---|
| 3 | Carrageenin-induced rat paw edema. | 250 | Active, mean C/T=2.14, ratio (4 rats). |
| 4 | Rat ear UV.-induced erythema. | 250 | Active, mean C/T=4.34, ratio (9 rats). |
| 5 | Yeast-induced pyrexia in rats. | 83.3 | Active, temp. C/T=3.2 (6 rats). |

As antibacterials or antifungals, compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspension, syrups, elixir, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive bacteria or fungi for either treatment or prophylaxis and may include, in addition to the foregoing, ointments, creams, emulsions, unguents, salves, emollients, sprays, washes or the like. In addition, compounds of this invention may be used in the form of solutions, suspensions, emulsions, washes, powders, dusts, mists, soaps, spray, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these componnds might be incorporated into soaps, detergents, sprays or the like in the home, farm, office or elsewhere with the purpose of preventing or minimizing infection or contamination with sensitive bacteria or fungi. Painting, spraying, immersion or other means of effecting contact may be applied. As analgesics or anti-inflammatory agents, compounds of this invention may be used in any of the pharmaceutical forms or modes accepted in the pharmaceutical art, such as suggested hereinabove.

The invention will be described in greater detail in conjunction with the following specific examples.

EXAMPLE 1

Preparation of 4-hydrazino-3-nitropyridine

Hydrazine hydrate (55.0 g., 1.10 mole) was added dropwise to a solution of 4-chloro-3-nitropyridine (79.2 g., 0.5 mole) in ethanol (500 ml.), and the mixture stirred for 1 hour. The reaction mixture was evaporated under reduced pressure and the solid residue stirred with water (100 ml.) and filtered. This was repeated twice until the filtrate was free from chloride ions. The product was recrystallized from ethanol using 200 mg. Darco 9–60 to give red-brown needles, 54.2 g. (70%), M.P. 203–204.5° C. (dec.). An analytical sample was recrystallized from ethanol to give fine orange-red needles, M.P. 205.5–206.5° C. (dec.).

EXAMPLE 2

Preparation of 3-amino-4-hydrazinopyridine

10% palladium-on-carbon (0.5 g.) was added to a solution of 4-hydrazino-3-nitropyridine (3.08 g., 0.02 mole) in ethanol (100 ml.). The mixture was shaken under hydrogen in a pan apparatus until the theoretical amount of hydrogen had been absorbed (30 minutes). The solution was then filtered to remove the catalyst and the filtrate evaporated under reduced pressure. The residue was recrystallized from ethanol to give ivory crystals, 1.66 g. (67%), M.P. 138–140° C. (dec.). An analytical sample was recrystallized from ethanol to give white crystals, M.P. 140–142° C.

EXAMPLE 3

Preparation of 4-(2-acetylhydrazino)-3-nitropyridine

Acetic anhydride (1.02 g., 0.01 mole) was added to a stirred mixture of 4-hydrazino-3-nitropyridine (1.54 g., 0.01 mole) in ethyl acetate (50 ml.) and the mixture was stirred for 1 hour. The product was isolated by filtration, and recrystallized from ethanol to give yellow needles, 1.53 g. (78%), M.P. 196–197° C. A sample was recrystallized from ethanol for analysis, to give yellow needles, M.P. 197–198° C.

EXAMPLE 4

Preparation of 4-(2-acetylhydrazino)-3-aminopyridine

10% palladium-on-carbon (0.5 g.), was added to a solution of 4-(2-acetylhydrazino)-3-nitropyridine (1.96 g., 0.01 mole) in ethanol. The mixture was shaken under hydrogen in a pan apparatus until the theoretical amount of hydrogen had been absorbed (30 minutes). The solution was then filtered to remove the catalyst and the filtrate evaporated under reduced pressure. No suitable solvent could be found for the amine which was hygroscopic and readily formed a carbonate. An ethanolic solution was evaporated under reduced pressure to give a sample for analysis.

EXAMPLE 5

Preparation of 1,2-dihydropyrido[3,4-e]-as-triazine dihydrochloride

Concentrated hydrochloric acid (1.75 ml.) was added to a stirred suspension of 3-amino-4-hydrazinopyridine (1.24 g., 0.01 mole) in triethylorthoformate (25 ml.). The mixture was stirred for 2 hours and the product isolated by filtration and recrystallized from ethanol to give an orange-red solid, 1.21 g. (60%), M.P. 230° C. (dec.).

EXAMPLE 6

Preparation of 1,2-dihydro-3-methylpyrido-[3,4-e]-as-triazine hydrochloride

Ethanolic hydrogen chloride (6 N, 5 ml.) was added to a solution of 4-(2-acetylhydrazino)-3-aminopyridine (1.66 g., 0.01 mole) in absolute ethanol (20 ml.). The solution became orange, and it was evaporated to dryness under reduced pressure. The product was an orange-red solid, 1.48 g. (80%), M.P. 297° C. (dec.). A sample for analysis was recrystallized from ethanol to give an orange-red solid, M.P. 297° C. (dec.).

EXAMPLE 7

Preparation of pyrido[3,4-e]-as-triazine

Ammonium hydroxide (10 ml.) was added to a solution of 1,2-dihydropyrido[3,4-e]-as-triazine (1.04 g., 0.005 mole) in water (20 ml.). A solution of potassium ferricyanide (3.3 g., 0.01 mole) in water (50 ml.) was added immediately and the mixture extracted (4×50 ml.) with chloroform. The combined chloroform extracts were dried over anhydrous magnesium sulfate, filtered and evaporated under reduced pressure. The residue was recrystallized from heptane to give orange prisms, 0.53 g. (81%), M.P. 90–91° C. (dec.). An analytical sample was recrystallized from heptane to give orange prisms, M.P. 90.5–91.5° C. (dec.).

EXAMPLE 8

Preparation of 3-methylpyrido[3,4-e]-as-triazine

Ammonium hydroxide (10 ml.) was added to a solution of 1,2-dihydro-3-methylpyrido[3,4-e]-as-triazine hydrochloride (0.92 g., 0.005 mole) in water (20 ml.). A solution of potassium ferricyanide (3.3 g., 0.01 mole) in water (50 ml.) was added immediately and the mixture extracted (4×50 ml.) with chloroform. The combined chloroform extracts were dried over anhydrous magnesium sulphate, filtered and evaporated under reduced pressure. The residue was recrystallized from heptane to give orange-red plates, 0.63 g. (87%), M.P. 113.5–114° C. An analytical sample was recrystallized from heptane to give orange-red plates, M.P. 114.5–115° C.

We claim:
1. A compound selected from the group consisting of those of the formula:

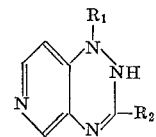

wherein $R_1$ is selected from the group consisting of hydrogen and lower alkyl and $R_2$ is selected from the group consisting of hydrogen, lower alkyl and lower carboalkoxy; and the non-toxic pharmaceutically acceptable acid-addition salts thereof.

2. A compound in accordance with claim 1 wherein $R_1$ is hydrogen and $R_2$ is methyl.

3. A compound in accordance with claim 1 wherein $R_1$ is hydrogen and $R_2$ is hydrogen.

4. A compound in accordance with claim 1 wherein $R_1$ is ethyl and $R_2$ is hydrogen.

5. A compound in accordance with claim 1 wherein $R_1$ is hydrogen and $R_2$ is carboisopropoxy.

6. A compound in accordance with claim 1 wherein $R_1$ is ethyl and $R_2$ is carbethoxy.

References Cited

FOREIGN PATENTS 1,449,778  7/1966  France _____ 260—248

JOHN M. FORD, Primary Examiner

U.S. Cl. X.R.

260—295K, 296R; 424—249